United States Patent [19]

Frommelt

[11] 4,293,969
[45] Oct. 13, 1981

[54] INFLATABLE SEAL

[75] Inventor: Sylvan J. Frommelt, Peosta, Iowa

[73] Assignee: Frommelt Industries, Inc., Dubuque, Iowa

[21] Appl. No.: 107,034

[22] Filed: Dec. 26, 1979

[51] Int. Cl.³ ............................................... E01D 1/00
[52] U.S. Cl. ....................................... 14/71.1; 49/477; 52/2; 114/263
[58] Field of Search ...................... 14/71.3, 71.1, 69.5; 49/477; 114/263; 52/2

[56] References Cited

U.S. PATENT DOCUMENTS

| | | | |
|---|---|---|---|
| 2,924,336 | 3/1961 | Kelley | 210/450 |
| 3,117,332 | 1/1964 | Kelley | 14/71.3 |
| 3,137,017 | 6/1964 | Pfleger | 14/71.3 |
| 3,359,687 | 12/1967 | Wallace | 49/477 |
| 3,584,324 | 6/1971 | Merrick | 14/71.3 |
| 3,840,930 | 10/1974 | Waddell | 14/71.3 |
| 4,010,505 | 3/1977 | Bouman | 14/71.3 |
| 4,020,607 | 5/1977 | Bjervig | 49/477 |
| 4,075,787 | 2/1978 | Krahe | 49/477 X |
| 4,126,909 | 11/1978 | Smith | 14/71.3 |
| 4,156,989 | 6/1979 | Sparrow | 49/477 X |

*Primary Examiner*—Nile C. Byers, Jr.
*Attorney, Agent, or Firm*—Emrich, Root, Lee, Brown & Hill

[57] ABSTRACT

An inflatable seal for use in an adjustable dockboard unit for sealing the unit against the flow of air therethrough into and/or out of the building in which the dockboard is being used.

12 Claims, 8 Drawing Figures

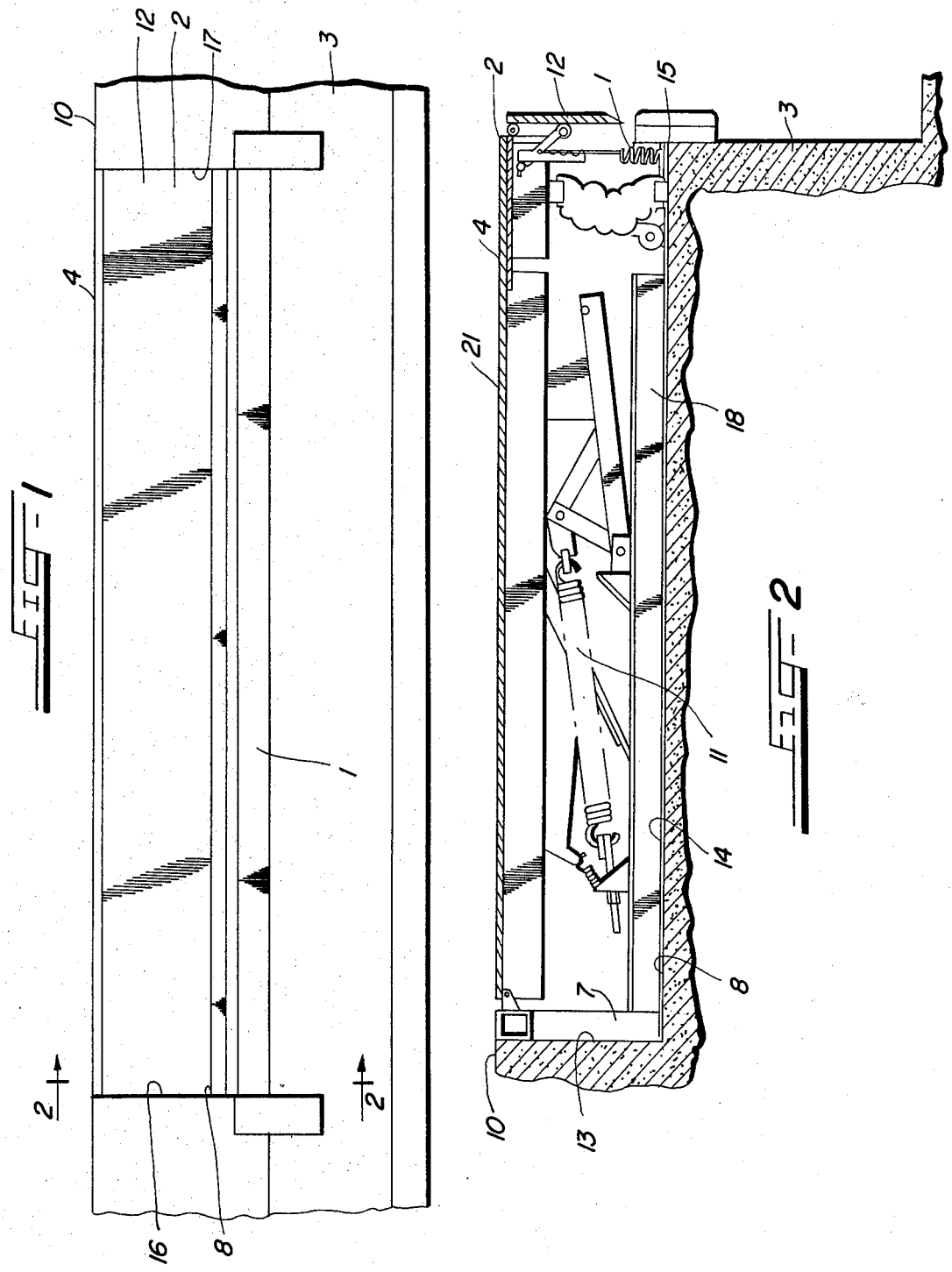

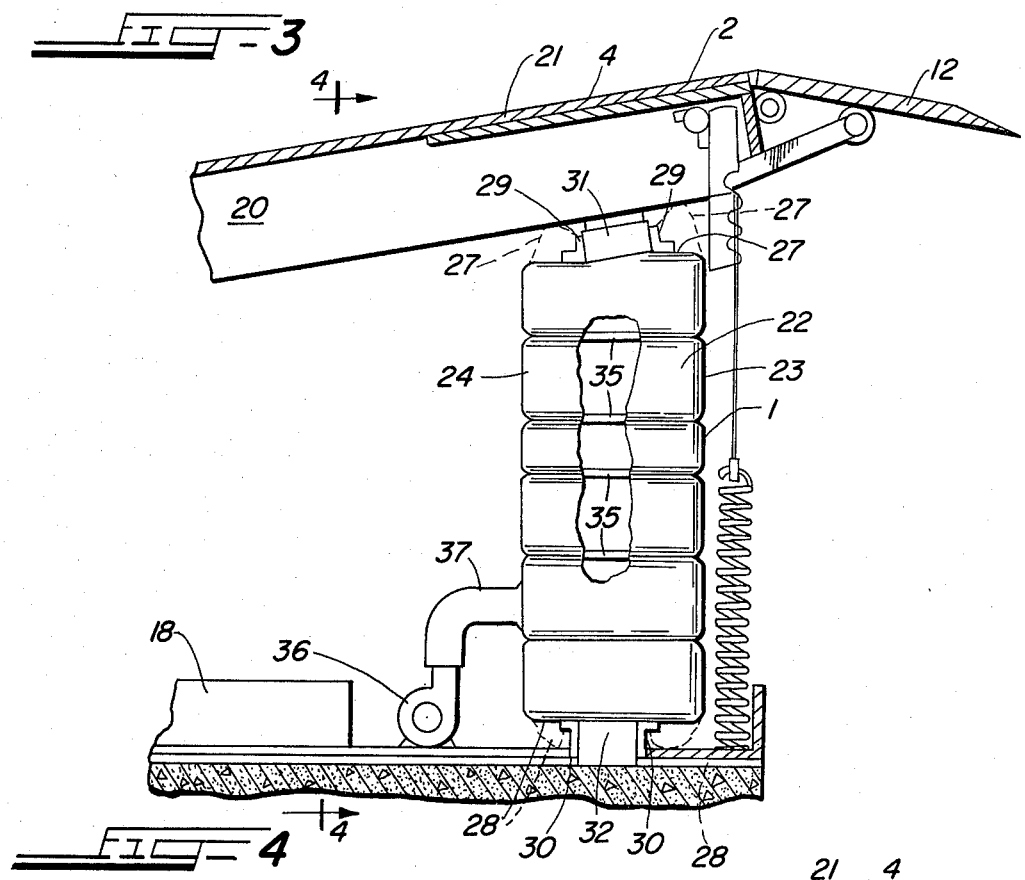
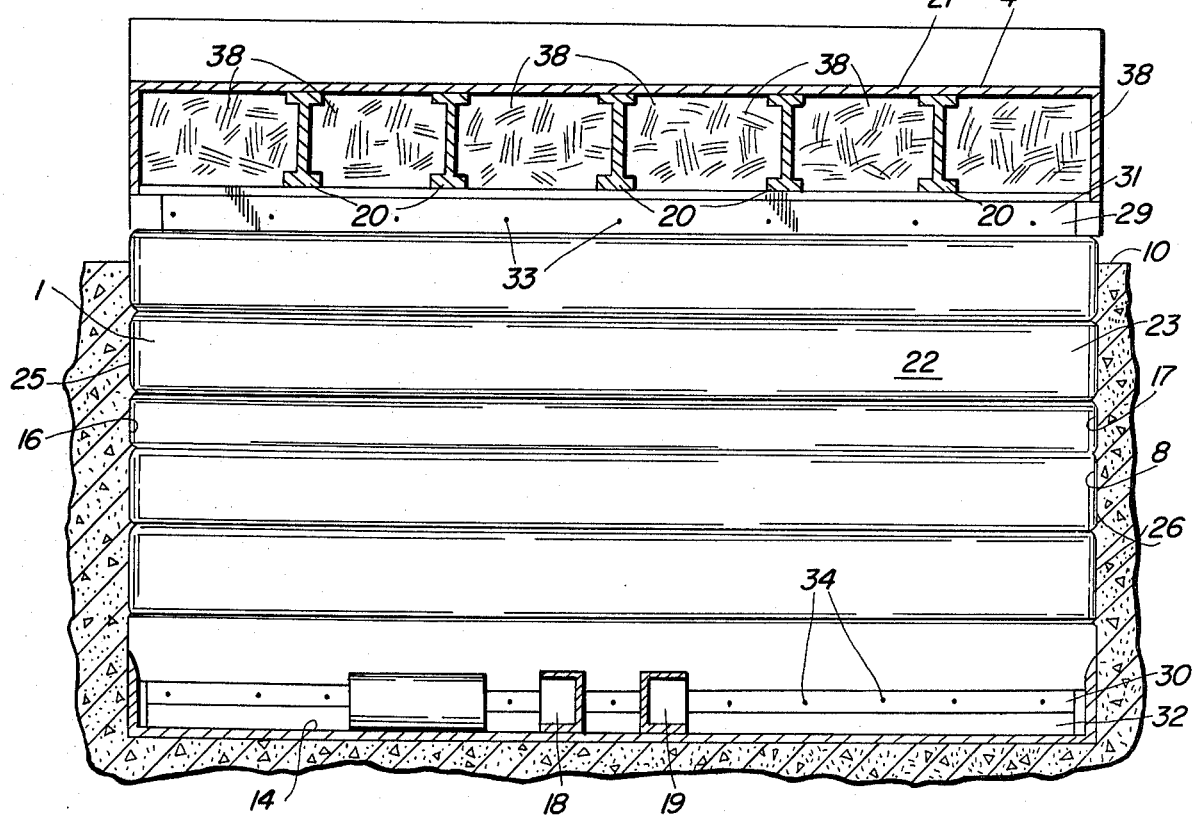

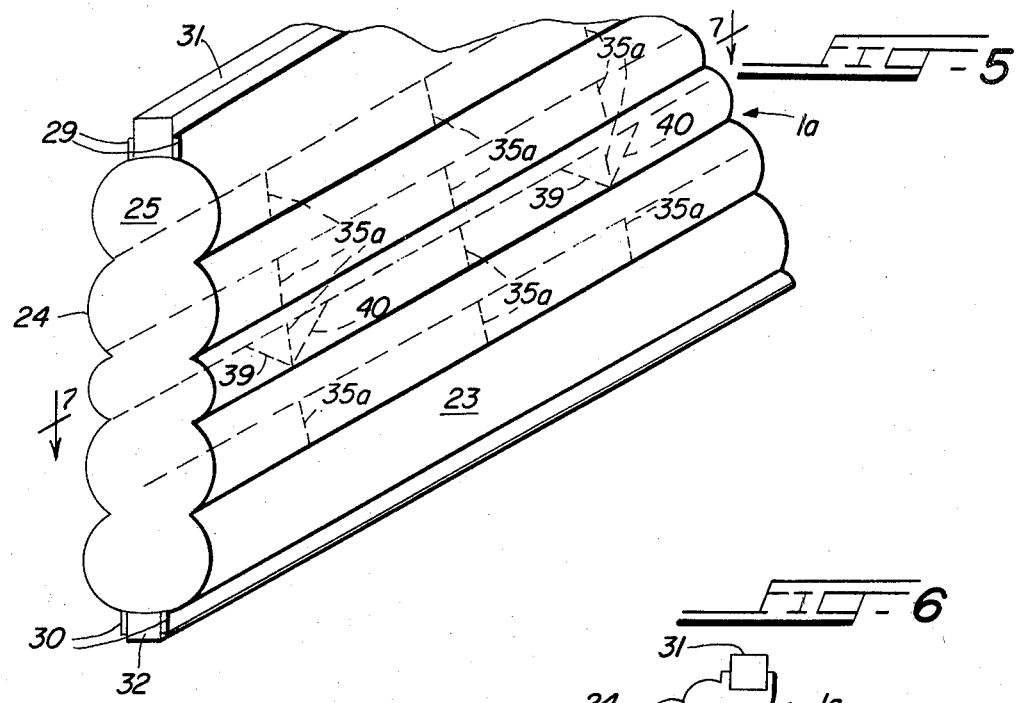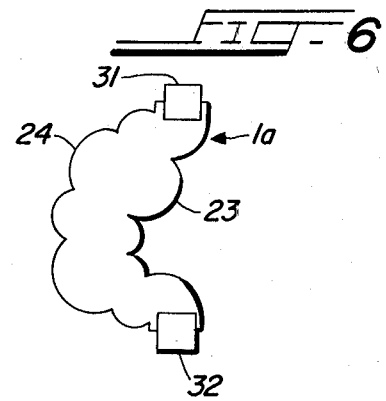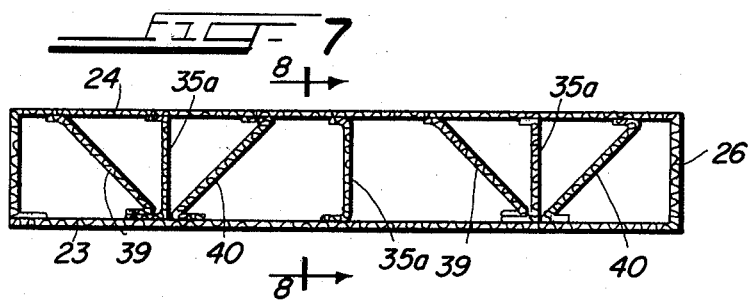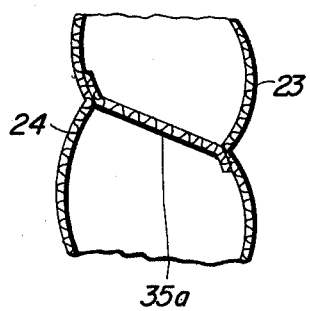

INFLATABLE SEAL

BACKGROUND OF THE INVENTION

This invention relates to seals, and, more particularly, to inflatable seals which are particularly well adapted for use with adjustable dockboards, and the like.

A primary object of the present invention is to afford a novel seal.

Another object of the present invention is to afford a novel inflatable seal for use with adjustable dockboards.

Adjustable dockboards, for use in the floors of loading docks, and the like, are well known in the art, being shown, for example, in U.S. Pat. No. 2,924,336, issued to G. P. Kelley on Mar. 14, 1961; U.S. Pat. No. 3,117,332, issued to G. P. Kelley et al. on Jan. 14, 1964; and U.S. Pat. No. 3,137,017, issued to R. H. Pflager et al. on June 16, 1964. As is well known to those skilled in the art, one troublesome and common problem in the use of dockboards of the aforementioned type has been the relatively free circulation of air therethrough, into and out of the buildings in which such dockboards have been used, thus creating a heating and/or cooling problem. Various manners of trying to overcome this problem have been heretofore tried, such as, for example, using a drop-curtain on the dockboard, or permanently closing in the front of the depression over which the dockboard is located. The previous attempts to solve the aforementioned problem have had several inherent disadvantages, such as, for example, not being practical and efficient in operation; being complicated in construction and operation; requiring undesired modifications; or being expensive to install, and the like. It is an important object of the present invention to overcome such disadvantages.

Another object of the present invention is to afford a novel seal for use with adjustable dockboards, which seal is operable to afford effective protection against the flow of air therethrough into and/or out of a building with which the dockboard is being used.

Another object of the present invention is to afford a novel seal of the aforementioned type which is inflatable.

An object which is ancillary to the foregoing is to afford a novel inflatable seal, which is so constituted and arranged that inflation thereof is effective to enhance the sealing characteristics of the seal.

A further object of the present invention is to afford a novel seal of the aforementioned type which may be quickly and easily installed in operative position in an adjustable dockboard unit.

Another object of the present invention is to afford a novel seal of the aforementioned type which is practical and efficient in operation, and which may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a fragmentary, front elevational view of a loading dock embodying an adjustable dockboard unit, which includes an inflatable seal embodying the principles of the present invention;

FIG. 2 is a sectional view taken substantially along the line 2—2 in FIG. 1;

FIG. 3 is an enlarged, fragmentary sectional view, similar to FIG. 2, but showing the dockboard unit in raised position;

FIG. 4 is a sectional view taken substantially along the line 4—4 in FIG. 3;

FIG. 5 is a perspective view of an inflatable seal comprising a modified form of the present invention;

FIG. 6 is a side elevation of the inflatable seal shown in FIG. 5, showing the seal in collapsed position;

FIG. 7 is a sectional view taken substantially along the line 7—7 in FIG. 5; and FIG. 8 is a fragmentary sectional view taken substantially along the line 8—8 in FIG. 7.

DESCRIPTION OF THE EMBODIMENT SHOWN HEREIN

An inflatable seal 1 is shown in the drawings in operative position relative to an adjustable dockboard unit 2, which is mounted in a loading dock 3, to illustrate the presently preferred embodiment of the present invention.

The dockboard unit 2 may be of any suitable type readily available on the market, the particular unit 2, shown in the drawings, being of the type shown in the aforementioned Pfleger et al. U.S. Pat. No. 3,137,017, and embodying an elongated ramp 4, having a front end portion 5 and a rear end portion 6, with the rear end portion 6 hingedly connected to a supporting frame 7 disposed in a shallow pit or depression 8 in the loading dock 3, FIG. 2. In operation, the ramp 4 is movable around its hinged connection 9 with the supporting frame 7 between a normal, lowered, at-rest position, wherein it is disposed in uniplanar relation to the floor 10 of the loading dock 3, as shown in FIG. 2, and a raised position, wherein it projects upwardly from its hinged connection 9 with the supporting frame 7 at a forwardly opening acute angle to the plane of the floor 10, as shown in FIG. 3. Such raising and lowering of the ramp 4 may be accomplished by any suitable mechanism 11, such as, for example, by raising and lowering mechanism of the type shown in the aforementioned Pfleger et al. U.S. Pat. No. 3,137,017.

Preferably, the dockboard unit 2 also embodies an extension lip 12 hingedly connected to the front end portion 5 of the ramp 4 for movement between a substantially vertically disposed, depending position, when the dockboard unit 2 is disposed in the aforementioned lowered position, as shown in FIG. 2, and a forwardly projecting raised position, as shown in FIG. 3, when the ramp 4 is disposed in raised position. Such raising and lowering of the extension lip 12 may be accomplished in any suitable manner, such as, for example, manually, or by mechanism of the type disclosed in the aforementioned Pfleger U.S. Pat. No. 3,137,017.

In the preferred form of the invention shown in the drawings, the pit 8 is disposed in a concrete portion of the loading dock 3, and embodies an upright rear wall 13, with a flat, bottom wall 14 projecting horizontally forwardly from the bottom of the rear wall 13 to the open end 15 of the pit 8, and with two vertically upright sidewalls 16 and 17 projecting upwardly from opposite sides of the bottom wall 14 and extending forwardly from the rear wall 13 to the front end 15 of the pit 8, FIGS. 2 and 4.

In the dockboard unit 2, shown in the drawings, the supporting frame 7 includes two elongated reinforcing beams 18 and 19, FIG. 4, projecting from the rear portion of the pit 8 to the front portion thereof in substantially parallel relation to each other and terminating in rearwardly spaced relation to the front end 15 of the pit 8; and the ramp 4 embodies a plurality of elongated reinforcing beams 20, disposed in spaced parallel relation to each other and projecting from the rear portion of the pit 8 to the front portion thereof in underlying, reinforcing relation to the deck 21 of the ramp 4, FIGS. 2 and 4.

The inflatable seal 1 embodies a substantially rectangular-shaped, body portion in the form of an air bag 22, having a front wall 23, a rear wall 24, two oppositely disposed sidewalls 25 and 26 extending between the front wall 23 and the rear wall 24, a top wall 27 closing the top thereof, and a bottom wall 28 closing the bottom thereof, FIGS. 3 and 4. A pair of spaced flaps 29 project outwardly from the top wall 27 and extend substantially the full length thereof in parallel relation to each other, and, similarly, a pair of spaced flaps 30 project outwardly from the bottom wall 28 and extend substantially the entire length thereof in parallel relation to each other, for a purpose which will be discussed in greater detail presently.

An elongated, substantially straight beam 31, FIGS. 3 and 4, is mounted on the lower face of the beams 20 and secured thereto by suitable means, such as bolts, or the like, not shown, the beam 31 extending substantially the full width of the ramp 4. Similarly, an elongated, substantially straight beam 32 is mounted on the bottom wall 14 of the pit 8, forwardly of the supporting beams 18 and 19, FIGS. 3 and 4, and secured thereto by suitable means, such as bolts, or the like, not shown, the beam 32 extending substantially the full width of the pit 8. The beams 31 and 32 may be made of any suitable material, such as, for example, wood.

In securing the inflatable seal 1 in operative position in the loading dock 3, the flaps 29 may be disposed on opposite sides of the beam 31, FIG. 3, and secured thereto by any suitable means such as, for example, nails 33, FIG. 4; and the flaps 30 may be disposed on opposite sides of the beam 32, FIG. 3, and secured thereto by any suitable means such as nails 34, FIG. 4.

The body portion 22 of the inflatable seal 1, and the flaps 29 and 30 preferably are made of a suitable, substantially air-impervious material, such as, for example, rubber impregnated nylon fabric, or the like. Also, preferably, a plurality of elongated, spaced, restraining members or straps 35 extend between, and are secured to the front wall 23 and the rear wall 24 of the body portion 2, in spaced relation to each other, FIG. 3, in position to periodically restrain the walls 23 and 24 from excessively bulging outwardly away from each other when the inflatable seal 1 is inflated.

For inflating and deflating the inflatable seal 1, a suitable electrically operated motor-blower unit 36, preferably is mounted in the lower portion of the pit 8 in closely adjacent relation to the inflatable seal 1, the motor-blower unit 36 being operatively connected to the lower end portion of the body portion 22 of the inflatable seal 1 by a suitable coupling, such as a flexible hose 37, FIGS. 3 and 4. Suitable controls, not shown, for the motor-blower unit 36 may be disposed at any suitable, readily available location, such as, for example, at the front of the loading dock 3. The motor-blower unit 36 may be of any suitable type readily available on the market, which is effective, when in operation, to force air into the seal 1, and, when not in operation, to exhaust air from the seal 1 by permitting the air to escape through the motor-blower unit 36.

In the preferred form of the invention shown in the drawings, the spaces between the top of the beam 31 and the bottom of the deck 21 of the ramp 4, not filled by the beams 20, are filled with a suitable, substantially air impervious sealing or insulating material 38, FIG. 4, such as a foamed polyether or polyester. Preferably, the material 38 is adhesively secured to the lower face of the deck 21 of the ramp 4.

The body portion 22 of the inflatable seal 1 is of such width, between the sidewalls 25 and 26 thereof, that, when the seal 1 is in inflated condition, the sidewalls 25 and 26 are yieldingly, pneumatically held in sealing engagement with the sidewalls 16 and 17 of the pit 8, as shown in FIG. 4. It will be remembered that the beam 31 is secured to the lower faces of the beams 20 of the ramp 4, in immediately underlying relation to the insulating material 38, and that the beam 32 is disposed on the bottom 14 of the pit 8. With this construction, and with the flaps 29 and 30 of the inflatable seal 1 secured to the beams 31 and 32, respectively, the flow of air between the top of the body portion 22 and the ramp 4, and between the bottom of the body portion 22 and the bottom 14 of the pit 8 is effectively restrained. If desired, the top wall 27 and the bottom wall 28 of the body portion 22 may embody sufficient material that, when the seal 1 is in inflated condition, they are bulged outwardly into engagement with the lower faces of the beams 20 and insulating material 38 and the upper face of the bottom wall 14 of the pit 8, respectively, as shown in broken lines in FIG. 3.

In the operation of the inflatable seal 1, when the motor-blower unit 36 is turned off, the body portion 22 is vented to atmosphere and, therefore, is in deflated condition. Normally, the inflatable seal 1 is in such condition when the dockboard unit 2 is in lowered position, as shown in FIG. 2. Even in this condition, it affords an effective seal for restraining the flow of air into or out of the pit 8 through the open front end thereof.

When the dockboard unit 2 is moved into raised position, as shown in FIG. 3, the inflatable seal 1 is pulled upwardly thereby into extended position. Even in collapsed condition, the inflatable seal 1 affords an effective retarding barrier to the flow of air into or out of the pit 8 through the front end portion thereof. However, normally, when the dockboard unit 2 is disposed in raised position, or during the raising thereof, the motor-blower unit 36 is energized to thereby feed air into the body portion 22 of the inflatable seal 1 and thus dispose it in expanded condition, as shown in FIGS. 3 and 4. Under such conditions, the inflatable seal 1 affords a substantially impervious seal against the passage of air into or out of the pit 8 through the front end portion thereof, the sidewalls 25 and 26 of the seal 1 being yieldingly pressed against the sidewalls 16 and 17 of the pit 8, the bottom of the body portion 22 being effectively sealed to the bottom wall 14 of the pit 8, and the top of the body portion 22 being effectively sealed to the bottom surface of the ramp 4 of the dockboard unit 2.

When it is desired to again lower the dockboard unit 2, the motor-blower unit 36 may be turned off to vent the inflatable seal 1 to atmosphere and thereby permit collapse of the same, and the dockboard unit 2 may be lowered into normal, at-rest position, as shown in FIG. 2.

A modified form of the present invention is illustrated in FIGS. 5-8, inclusive, of the drawings. This modified form of the present invention embodies the same general principles as the preferred form illustrated in FIGS. 1-4, inclusive, and parts which are the same as parts shown in FIGS. 1-4 are indicated by the same reference numerals, and parts which are similar but which have been substituted for parts shown in FIGS. 1-4 are indicated by the same reference numerals with the suffix "a" added.

The inflatable seal 1a, shown in FIGS. 5-8, is the same in construction as the inflatable seal 1, shown in FIGS. 1-4, except that the elongated, restraining members or straps 35a extend upwardly, at a rearwardly opening acute angle to the horizontal, from the front wall 23 to the rear wall 24 of the inflatable seal 1a; and two pairs of other elongated, restraining members or straps 39 and 40 are secured to, and extend between the front wall 23 and the rear wall 24 of the inflatable seal 1a, on opposite horizontal sides of the two outermost straps 35a disposed in the vertical mid-portion of the inflatable seal 1a, FIGS. 5 and 7. Like the restraining members 35a, the restraining members 39 and 40 are secured to the front wall 23 and the rear wall 24 by suitable means, such as, for example, stitching, and project upwardly from the front wall 23 to the rear wall 24 at the same acute angle to the horizontal, as the restraining members 35a. Also, the restraining members 39 and 40 project outwardly, at a rearwardly opening acute angle, from the restraining members 35a, with respect to which they are adjacently disposed.

The acute angle at which the restraining members 35a, 39 and 40 are disposed to the horizontal may be any suitable angle, but, preferably, is not substantially less than 15 degrees and not substantially more than 25 degrees, and, preferably, is in the nature of 20 degrees. Also, the angle at which the members 39 and 40 project outwardly from the respective adjacent members 35a may be any suitable angle, but, preferably, is not substantially less than 20 degrees and not substantially more than 40 degrees, and, preferably, is in the nature of 30 degrees. Thus, in the preferred form of the inflatable seal 1a, if the straps 35a are 7 inches in length, the straps 39 and 40 may be in the nature of 13 inches in length, and the rear end portions of the straps 35a, 39 and 40 may be disposed two and one-half inches above the front end portion thereof.

With this construction, when the dock leveler, such as the dock leveler 2, in which the inflatable seal 1a is disposed, is moved from the raised position shown in FIG. 3 to the lowered position shown in FIG. 2, with the seal 1a in inflatable condition, the latter is caused to collapse downwardly and rearwardly from the position shown in FIG. 5 to the position shown in FIG. 6, the straps 35a, 39 and 40 applying internal tension on the walls 23 and 24 effective to cause such collapsing movement of the inflatable seal 1a. This, it will be seen, is effective to insure that the seal 1a does not bulge outwardly or forwardly from the dock leveler 2 under such conditions.

Of course, the inflatable seal 1a may be in deflated condition during raising and lowering of the dock leveler 2, in which it is mounted, and, under those circumstances, it will extend or collapse substantially vertically in the same manner as heretofore described with respect to the inflatable seal 1, shown in FIGS. 1-4.

From the foregoing it will be seen that the present invention affords a novel inflatable seal.

In addition, it will be seen that the present invention affords a novel, effective seal for use with adjustable dockboard units.

Also, it will be seen that the present invention affords a novel seal of the aforementioned type which is practical and efficient in operation, and which may be readily and economically produced commercially.

Thus, while I have illustrated and described the preferred embodiment of my invention, it is to be understood that this is capable of variation and modification, and I therefore, do not wish to be limited to the precise details set forth, but desire to avail myself of such changes and alterations as fall within the purview of the following claims.

I claim:

1. In an adjustable dockboard for spanning the gap between a loading dock and the bed of a carrier in loading or unloading position in front of the dock, the dockboard embodying a stationary mounting structure, a ramp having front and rear portions, with the rear portion hingedly connected to said mounting structure so that the ramp can swing up and down around a horizontal axis between a raised position wherein it is disposed at a forwardly opening acute angle to the horizontal above the floor of the loading dock and a lowered position wherein it is disposed in horizontally extending position wherein it is substantially flush with said floor of said loading dock, and said mounting structure including a depression in said loading dock, said depression embodying two oppositely disposed side walls, between which said ramp is disposed when it is disposed in said lowered position, a rear wall and an open front, the combination of a. an inflatable member
  (1) mounted in said depression, and
  (2) extending
    (a) between said side walls, and
    (b) between said front portion of said ramp and the bottom of said depression,
b. said inflatable member being movable between
  (1) a collapsed position wherein it is disposed between said lowered ramp and said bottom of said depression, and
  (2) an extended position wherein it is disposed between said raised ramp and said bottom of said depression, and
c. means for inflating and deflating said inflatable member.

2. The combination, in an adjustable dockboard, defined in claim 1, and in which
a. said inflatable member is disposed in abutting engagement with said side walls when said inflatable member is inflated.

3. The combination, in an adjustable dockboard, defined in claim 2, and in which
a. said inflatable member is disposed in abutting engagement with said ramp and said bottom of said depression when said inflatable member is inflated.

4. The combination, in an adjustable dockboard, defined in claim 3, and in which a. said inflatable member is movable, with said ramp, between said raised and collapsed positions thereof, when said inflatable member is in inflated condition.

5. The combination, in an adjustable dockboard, defined in claim 2, and in which
a. said inflatable member includes
(1) a front wall facing toward said open front,
(2) another rear wall facing toward said rear wall of said depression, and
(3) a plurality of elongated, spaced restraining members extending between and secured to said front wall and said other rear wall.

6. The combination, in an adjustable dockboard, defined in claim 5, and in which
a. said inflatable member includes
(1) means for bending said inflatable member toward said rear wall of said depression when said ramp is moved from said raised position to said lowered position thereof, with said inflatable member in inflated condition.

7. The combination, in an adjustable dockboard, defined in claim 6, and in which
a. said means for bending said inflatable member comprises
(1) certain of said restraining members disposed in the vertical mid-portion of said inflatable member, and
(2) other elongated, spaced restraining members extending between and secured to said front wall and said other rear wall on two horizontally opposite sides of each of said certain restraining members, and
b. said certain and other restraining members extend upwardly from said front wall to said other rear wall at a rearwardly opening acute angle to the horizontal.

8. In an adjustable dockboard for spanning the gap between a loading dock and the bed of a carrier in loading or unloading position in front of the dock, the dockboard embodying a stationary mounting structure, a ramp having front and rear portions, with the rear portion hingedly connected to said mounting structure so that the ramp can swing up and down around a horizontal axis between a raised position wherein it is disposed at a forwardly opening acute angle to the horizontal above the floor of the loading dock and a lowered position wherein it is disposed in horizontally extending position wherein it is substantially flush with the floor of said loading dock, and said mounting structure including a depression in said loading dock, said depression embodying two oppositely disposed side walls, between which said ramp is disposed when it is disposed in said lowered position, a rear wall and an open front, the combination of
a. an inflatable member
(1) mounted in said depression, and
(2) extending
(a) between said side walls and
(b) between said front portion of said ramp and the bottom of said depression,
b. said inflatable member being
(1) secured to
(a) said front portion of said ramp, and
(b) said bottom of said depression, and
(2) movable by said ramp between
(a) a collapsed position wherein it is disposed between said lowered ramp and said bottom of said depression, and
(b) an extended position wherein it is disposed between said raised ramp and said bottom of said depression, and
c. means for inflating said inflatable member, when the latter is disposed in said extended position, into abutting engagement with said side walls, said ramp and said bottom of said depression.

9. The combination, in an adjustable dockboard, defined in claim 8, and in which
a. said inflatable member is disposed in abutting engagement with said side walls throughout substantially the full height of the latter when said inflatable member is so inflated in said extended position thereof.

10. In an adjustable dockboard for spanning the gap between a loading dock and the bed of a carrier in loading or unloading position in front of the dock, the dockboard embodying a stationary mounting structure, a ramp having front and rear portions, with the rear portion hingedly connected to said mounting structure so that the ramp can swing up and down around a horizontal axis between a raised position wherein it is disposed at a forwardly opening acute angle to the horizontal above the floor of the loading dock and a lowered position wherein it is disposed in horizontally extending position wherein it is substantially flush with said floor of said loading dock, and said mounting structure including a depression in said loading dock, said depression embodying two oppositely disposed side walls, between which said ramp is disposed when it is disposed in said lowered position, a rear wall and an open front, and wherein the bottom of said ramp comprises a plurality of elongated beams extending between the front and rear edges thereof in substantially parallel spaced relation to each other, the combination of
a. means disposed between said beams at said front portion of said ramp for closing the spaces therebetween,
b. an inflatable member
c. means securing the top of said inflatable member to the bottom of said beams across substantially the full width of said front portion of said ramp,
d. means securing the bottom of said inflatable member to the bottom of said depression across substantially the full width of said depression between said side walls thereof,
e. said inflatable member being movable upwardly and downwardly by said ramp between said raised and lowered positions of the latter, and
f. means for inflating said inflatable member, when said ramp is disposed in said raised position, to thereby yieldingly urge said inflatable member into sealing engagement with said side walls substantially throughout the height of the latter.

11. The combination, in an adjustable dockboard, defined in claim 10, and in which
a. said inflation of said inflatable member is effective to yieldingly urge said inflatable member
(1) into sealing engagement with the bottom of said beams and said first mentioned means, and
(2) into sealing engagement with said bottom of said depression.

12. The combination, in an adjustable dockboard, defined in claim 10, and in which
a. said means securing the top of said inflatable member comprises
(1) an elongated member
(a) mounted on said beams, and (b) extending across substantially the full width of said ramp, and
(2) flaps extending from said inflatable member and secured to said elongated member, and
b. said means securing the bottom of said inflatable member comprises (1) another elongated member
   (a) mounted on said bottom of said depression, and
   (b) extending across substantially the full width of said bottom between said side walls, and
(2) flaps extending from said inflatable member and secured to said other elongated member.

* * * * *